(12) United States Patent
Mihara et al.

(10) Patent No.: US 6,252,027 B1
(45) Date of Patent: Jun. 26, 2001

(54) THERMALLY FORMED ARTICLE, PRODUCTION PROCESS OF THERMALLY FORMED ARTICLE, TONER CARTRIDGE, AND RECORDING MEDIUM

(75) Inventors: Chieko Mihara, Isehara; Toshihiko Takeda, Atsugi; Yoshihiko Kikuchi, Atsugi; Masato Minami, Atsugi, all of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/394,409

(22) Filed: Sep. 13, 1999

(30) Foreign Application Priority Data

| Sep. 14, 1998 | (JP) | 10-276423 |
| Oct. 15, 1998 | (JP) | 10-307795 |
| Oct. 22, 1998 | (JP) | 10-301116 |
| Feb. 9, 1999 | (JP) | 11-031794 |

(51) Int. Cl.$^7$ .......................... C08G 63/00; G03G 13/00; B28D 22/00
(52) U.S. Cl. .......................... 527/311; 528/271; 528/300; 528/301; 527/300; 527/604; 428/35.7; 428/221; 428/357; 430/31
(58) Field of Search .................. 528/271, 300, 528/301; 527/300, 311, 604; 428/35.7, 221, 357; 430/31

(56) References Cited

U.S. PATENT DOCUMENTS

| 4,713,436 | 12/1987 | Downs et al. | 528/295.3 |
| 5,191,016 | 3/1993 | Yalpani | 525/54.2 |

FOREIGN PATENT DOCUMENTS

| 0542299 | 5/1993 | (EP) . |
| 0814093 | 12/1997 | (EP) . |
| 430409 | 6/1935 | (GB) . |
| 5-287043 | 11/1993 | (JP) . |

OTHER PUBLICATIONS

Kurita, et al., "Synthetic Polymers . . . Polycondensation", J. Poly. Sci., Polym. Chem. Ed., vol. 18, 365–370 (1980).

*Primary Examiner*—Samuel A. Acquah
(74) *Attorney, Agent, or Firm*—Fitzpatrick, Cella, Harper & Scinto

(57) ABSTRACT

The invention provides a thermally formed article having biodegradability, recycling ability and thermoplasticity. The thermally formed article comprises a sugar polymer represented by the following general formula

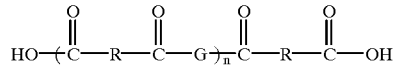

wherein G is a residue of a monosaccharide, oligosaccharide or polysaccharide, R is a linear or branched alkylene group having at least 4 carbon atoms when G is the residue of the monosaccharide, or a linear or branched alkylene group having at least 6 carbon atoms when G is the residue of the oligosaccharide or polysaccharide, and n is an integer of 1 to 5,000.

12 Claims, 7 Drawing Sheets

DEGRADATION METHOD 1

DEGRADATION METHOD 2

THERMALLY FORMED ARTICLE, PRODUCTION PROCESS OF THERMALLY FORMED ARTICLE, TONER CARTRIDGE, AND RECORDING MEDIUM

BACKGROUND OF THE INVENTION

1. Field of the Invention

The present invention relates to a thermally formed article comprising a sugar polymer, a production process thereof, a toner cartridge, and a recording medium, and particularly to a thermally formed article which has biodegradability and recycling ability and is excellent in flexural strength and tensile strength, a production process thereof, a toner cartridge, and a recording medium.

2. Related Background Art

Environmental pollution of the earth is actualized, and not only industrial waste but also domestic refuse requires consideration for the environment. Under such circumstances, plastic resins, which are industrial materials, are also required to be treated so as to lighten a burden imposed on the environment. Alternatively, there is a demand for development of new materials which scarcely impose a burden on the environment and can be disposed.

The conventional methods for treating waste plastics are methods comprising degrading the waste plastics into low-molecular weight products by, for example, thermal cracking or chemical decomposition, and incinerating or burying the low-molecular weight products. However, the incineration is accompanied by exhaust of carbon dioxide and hence results in a cause of warming of the earth. When halogens, sulfur and/or nitrogen elements are contained in the resins, there is a possibility that the incineration may cause air pollution due to harmful gases. When the waste plastics are buried, almost all resins now practically used remain for a long period of time as they are. Additives and the like in the resins run out during this period to cause soil pollution.

In order to cope with such problems, the development of biodegradable polymers is actively conducted as polymers which do not adversely affect the global environment and the like upon the final disposal thereof (for example, Japanese Patent Application Laid- Open No. 5-287043). Biodegradable resins are roughly classified into three types: microbially produced products, natural products derived from plants and chemically synthesized products. An example of the microbially produced products is polyester copolymer of D-3-hydroxy-butyrate and 3-hydroxyvalerate by *Alcaligenes eutroplus*, which is marketed under the trade name of "Biopol". These products are biodegraded by microorganisms.

Examples of the natural products include collagen, gelatin, starch, cellulose and chitosan. These products have biodegradability by themselves. Further, mixtures of starch and modified polyvinyl alcohol, cellulose esters obtained by chemically modifying cellulose, complexes of cellulose and chitosan, and the like are also known. In the chemically synthesized products, water-soluble polymers such as polyvinyl alcohol, polyethylene glycol, aliphatic polyesters such as polyethylene adipate and polycaprolactone, and the like exhibit biodegradability.

On the other hand, from the viewpoint of effective utilization of resources, it is known to reuse low-molecular weight products derived from waste plastics as raw materials for polymers. For example, polystyrene is recovered as a styrene monomer and a styrene dimer by catalytic cracking using a solid base catalyst to supply them as raw materials for repolymerization; and polyethylene terephthalate is degraded into dimethyl phthalate, ethylene glycol, terephthalic acid, etc. by a methanolysis process using methanol, a glycolysis process using ethylene glycol or a hydrolysis process using an acid or base, and these products are utilized as raw materials for polyethylene terephthalate, or other chemicals. However, in order to take out reusable components in these cases, it is necessary to fractionate and purify degradation products through many processes. As biodegradable polymers which can solve such a problem, the present applicant et al. disclosed sugar polymers, which can be biodegraded particularly by enzymolysis and permit effective reuse of the degradation products, in EP 814093A2.

Kurita et al. (Journal of Polymer Science: Polymer Chemistry Edition, 18, 365–370, 1980) describe copolymers of cellobiose with adipic acid or phthalic acid.

SUMMARY OF THE INVENTION

The development of these biodegradable plastics has been advanced to date from the viewpoint of biodegradability. The present inventors have evaluated the thermal formability of the copolymer of cellobiose and adipic acid disclosed by Kurita et al. with respect to the prediction that easiness in thermal forming and high strength of thermally formed articles will be required in order to spread such biodegradable plastics as substitutes for the conventional plastics. It has been then found that the copolymer has no softening point at any temperature lower than the decomposition point thereof and exhibits no thermoplasticity due to the little effect of adipic acid on internal plasticization. Similarly, with respect to the copolymer of cellobiose and phthalic acid, it has a decomposition point alone, and does not exhibit thermoplasticity due to strong interaction between polymeric main chains by the presence of an aromatic ring like phthalic acid.

The present inventors have thus carried out a further investigation. As a result, it has been found that substances which are easy to form thermally and provide thermally formed articles having excellent strength are included among the biodegradable sugar polymers described in EP 814093A2 filed by the present applicant et al.

The present invention has been completed on the basis of such findings, and an object thereof is to provide a biodegradable thermally formed article having excellent strength.

Another object of the present invention is to provide a process for producing a thermally formed article having excellent strength from a biodegradable polymer.

A further object of the present invention is to provide a toner cartridge and a recording medium which have excellent strength and can be disposed with a small burden on the global environment.

According to one aspect of the present invention, there is thus provided a thermally formed article comprising a sugar polymer represented by the following general formula:

(I)

wherein G is a residue of a monosaccharide, oligosaccharide or polysaccharide, R is a linear or branched alkylene group having at least 4 carbon atoms when G is the residue of the monosaccharide, or a linear or branched alkylene group having at least 6 carbon atoms when G is the residue of the oligosaccharide or polysaccharide, and n is an integer of 1 to 5,000.

The present inventors have carried out various investigations as to sugar-containing polymers. As a result, it has been found that the compounds represented by the general formula (I) have excellent thermoplasticity, thus leading to completion of the present invention. The sugar polymers represented by the general formula (I) each have a softening point at a temperature lower than the decomposition point thereof and hence permit producing excellent thermally formed articles.

In the general formula (I), G represents a residue of a monosaccharide, oligosaccharide or polysaccharide. When G is the residue of the monosaccharide, R is preferably a linear or branched alkylene group having at least 4 carbon atoms, preferably 4 to 14 carbon atoms, more preferably 4 to 10 carbon atoms. When G is the residue of the oligosaccharide or polysaccharide, R is preferably a linear or branched alkylene group having at least 6 carbon atoms, preferably 6 to 14.carbon atoms, more preferably 6 to 10 carbon atoms. These alkylene groups may be substituted by, for example, a methyl or ethyl group, or the like.

n is an integer of 1 to 5,000, preferably 50 to 2,000. G represents a sugar residue and may be trisubstituted or more highly substituted.

The sugar residue preferably forms an ester linkage when it is a residue of a sugar containing only hydroxyl groups, or an amide linkage and/or an ester linkage when it is a residue of an amino-group-containing sugar.

The sugar residue is preferably a residue of a monosaccharide, oligosaccharide or polysaccharide containing only a pyranose ring.

The monosaccharide is preferably at least one of glucose, mannose, galactose and glucosamine.

The oligosaccharide is preferably at least one of maltose, cellobiose, lactose, isomaltose, chitobiose, nigerose, trehalose, melibiose, cellotriose, chitotriose, maltotriose, cellotetraose, chitotetraose, maltotetraose, cellopentaose, maltopentaose, chitopentaose, cellohexaose, maltohexaose and chotohexaose.

The polysaccharide is preferably at least one of cellulose, starch, glycogen, galactan, mannan, chitin, chitosan and pullulan.

The sugar polymers according to the present invention have recycling ability in which substances produced by (1) selectively breaking hydrolyzable linkages (ester linkage, amide linkage, etc.) between G and R in the general formula (I) or (2) selectively breaking glycoside linkages between sugars (except for the case of the monosaccharide) can be easily utilized as raw materials, and have biodegradability in soil and compost. Further, these novel sugar polymers each have a softening point at a temperature lower than the decomposition point thereof and hence have good thermoplasticity, so that they can be subjected to hot melt and hot press forming. They may become materials more suitable for mass production.

Processability of the sugar polymers according to the present invention is improved by subjecting them to hot melt and hot press forming making good use of their excellent thermoplasticity, whereby thermally formed articles can be produced at lower cost.

According to another aspect of the present invention, there is also provided a process for producing a thermally formed article, comprising the step of heating a polymeric compoud containing a sugar polymer represented by the general following formula to a temperature not lower than the softening point thereof, but lower than the heat decomposition temperature thereof to form it.

wherein G is a residue of a monosaccharide, oligosaccharide or polysaccharide, R is a linear or branched alkylene group having at least 4 carbon atoms when G is the residue of the monosaccharide, or a linear or branched alkylene group having at least 6 carbon atoms when G is the residue of the oligosaccharide or polysaccharide, and n is an integer of 1 to 5,000.

According to further aspect of the present invention, there is further provided a toner cartridge comprising the thermally formed article described above.

According to still further aspect of the present invention, there is still further provided a recording medium comprising the thermally formed article described above.

DESCRIPTION OF THE PREFERRED EMBODIMENTS (Sugar Polymer)

The sugar polymers and thermally formed articles using such a polymer will hereinafter be described in detail. A thermally formed article according to the present invention comprises a sugar polymer represented by the general formula In the formula (I), G represent a residue of a monosaccharide, oligosaccharide or polysaccharide. When G is the residue of the monosaccharide, R is preferably a linear or branched alkylene group having at least 4 carbon atoms, preferably 4 to 14 carbon atoms, more preferably 4 to 10 carbon atoms. When G is the residue of the oligosaccharide or polysaccharide, R is preferably a linear or branched alkylene group having at least 6 carbon atoms, preferably 6 to 14 carbon atoms, more preferably 6 to 10 carbon atoms. These alkylene groups may be substituted by, for example, a methyl or ethyl group, or the like.

n is an integer of 1 to 5,000, preferably 50 to 2,000. G represents a sugar residue and may be trisubstituted or more highly substituted.

A sugar polymer obtained by, for example, reacting an oligosaccharide or polysaccharide with a dicarboxylic acid having a small number of carbon atoms, such as adipic acid (number of carbon atoms=4) has no softening point at a temperature lower than the decomposition point thereof, whereas a sugar polymer obtained by reacting the oligosaccharide or polysaccharide with a long dicarboxylic acid having at least 6 carbon atoms, such as sebacic acid (number of carbon atoms=8) comes to have a softening point at a temperature lower than the decomposition point thereof, since the dicarboxylic acid moiety contributes to the internal plasticization.

So far as the chain length of the aliphatic hydrocarbon in the dicarboxylic acid moiety is at least 4 when G in the formula (I) is the residue of the monosaccharide, or at least 6 when G is the residue of the oligosaccharide or polysaccharide, the resulting sugar polymer has thermoplasticity (softening point) and so it can be provided as a thermally formable and biodegradable polymer. On the other hand, the number of carbon atoms in the dicarboxylic acid is preferably at most 14, more preferably at most 10. Namely, so far as the number of carbon atoms falls within this range, the softening point of the resulting sugar polymer is not too low, and so the sugar polymer can be provided as a biodegradable polymer having excellent heat resistance. Examples of the dicarboxylic acid usable only in the case where G is the residue of the monosaccharide include adipic acid and pimelic acid. Specific examples of the dicarboxylic acid usable in the case where G is the residue of the oligosaccharide or polysaccharide include aliphatic dicarboxylic acids such as suberic acid, azelaic acid, sebacic acid, undecanedicarboxylic acid, dodecanedicarboxylic acid, tridecanedicarboxylic acid, tetradecanedicarboxylic acid, pentadecanedicarboxylic acid and hexadecanedicarboxylic acid, and derivatives (salts, acid chlorides, esters, acid anhydrides, etc.) thereof. These dicarboxylic acids may be substituted at their aliphatic hydrocarbon moieties by a linear or branched alkyl group (for example, methyl or ethyl group, or the like) having about 1 to 3 carbon atoms. More specifically, for example, 2-methylazelaic acid is exemplified.

In the general formula (I), G represents a sugar residue, i.e., a residue of a monosaccharide, oligosaccharide or polysaccharide. These sugar moieties preferably comprise a sugar containing only a pyranose ring.

Typical examples of monosaccharides containing only the pyranose ring include glucose (glucopyranose), mannose (mannopyranose), galactose (galactopyranose) and glucosamine.

Typical examples of oligosaccharides containing the pyranose rings include disaccharides such as cellobiose, lactose, maltose, isomaltose, chitobiose, nigerose, trehalose and melibiose, trisaccharides such as cellotriose, chitotriose and maltotriose, and tetra- or still higher oligosaccharides such as cellotetraose, chitotetraose, maltotetraose, cellopentaose, chitopentaose, maltopentaose, cellohexaose, chotohexaose and maltohexaose.

Typical examples of polysaccharides containing the pyranose rings include chitin, chitosan, cellulose, starch, glycogen, galactan, mannan and pullulan. These saccharides may be sugar derivatives in which OH groups contained in their molecules have been substituted by, for example, an acetyl or benzyl group.

These saccharides have a glycoside linkage. Examples thereof include α-linkage and β-linkage. Linkages with a reducing sugar include (1→2) linkage, (1→3) linkage, (1→4) linkage and (1→6) linkage, and linkages with a nonreducing sugar include (1⇔2) linkage and (1⇔1) linkage.

In the present invention, the linkage between the sugar and the aliphatic dicarboxylic acid for forming the repeating unit of the sugar polymer is desirably an ester linkage when the sugar moiety contains only OH groups (for example, cellobiose or the like), or an amide linkage when the sugar moiety contains an amino group (for example, chitobiose or the like).

The sugar polymer can be produced by subjecting a hydroxyl group or amino group of such a sugar as described above and a dicarboxylic acid, dicarboxylic acid chloride or dicarboxylic acid ester to a condensation reaction to polymerize them with an ester linkage or amide linkage, thereby forming a main chain of the sugar polymer.

Further, the number of ester linkages or amide linkages in G is two (disubstituted) or more for producing the sugar polymer. When G is disubstituted, a more linear main chain is formed. When G is trisubstituted or more highly substituted, the resulting polymer may become branched. It is desired that the degree of substitution of the sugar polymer be controlled according to the application of the resulting formed article.

The ester linkage is formed by reacting an -OH group at any position of 1-, 2-, 3-, 4- and 6-position in sugar with a dicarboxylic acid as the other component.

n indicates a degree of polymerization and is an integer of 1 to 5,000, preferably 50 to 2,000.

(Thermally Formed Article)

The sugar polymers described above have thermoplasticity and can be formed into the desired form by heating or by heating and pressing. More specifically, for example, the sugar polymer is formed in the form of powder, particle, pellet, flake or the like, and such a formed product is then suitably thermally formed into the desired form by a method such as pressure molding, film forming, extrusion or injection molding, whereby various kinds of formed or molded articles can be produced.

The sugar polymers according to the present invention can be thermally formed in the temperature range of from not lower than the softening point thereof to lower than the decomposition point thereof, specifically the temperature range of, for example, from 100 to 180° C., thereby providing thermally formed particles having sufficient strength from the viewpoint of practical use. More specifically, thermally formed articles having flexural strength of about 1.0 to 6.0 kg/mm$^2$ and tensile strength of about 20 to 700 kg/cm$^2$ can be produced. The strength is equivalent to that of, for example, general-purpose polyester conventionally used, which opens a way to substitute biodegradable plastics for general-purpose plastics.

By the way, various kinds of additives such as flame retardants, stabilizers, ultraviolet absorbents, antioxidants, plasticizers, lubricants and decomposition and degradation facilitating agents, pigments and dyes, and besides other components may be suitably incorporated into the sugar polymer for providing thermally formed articles, so far as no detrimental influence is thereby imposed on the biodegradability and recycling ability of the sugar polymers. For example, an ester of an aliphatic dibasic acid may also be added as a plasticizer.

The kneading of the sugar polymer with such other components can be conducted by means of the conventionally known method, for example, the use of mixers such as the Banbury mixer and Henschel mixer, kneaders, and various kinds of extruders. Kneading conditions may be suitably determined according to the type and amount of components added and a kneader or the like used. For example, when a kneader or the Banbury mixer is used, the temperature should be controlled to 60 to 250° C., preferably 70 to 230° C. to knead the components for 1 to 40 minutes, preferably 2 to 20 minutes at this temperature.

(Biodegradation of Thermally Formed Article)

Figure 1:
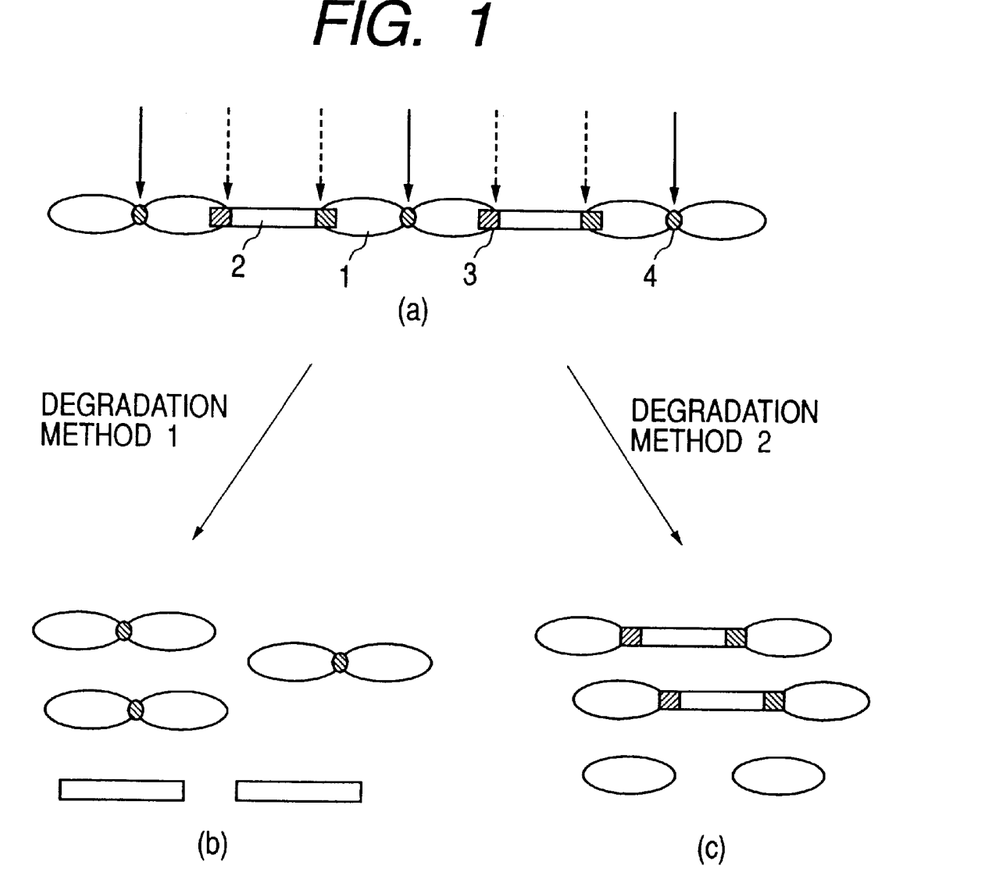
FIG. 1 schematically illustrates the degradation of an embodiment of a sugar polymer according to the present invention.

The biodegradation of the thermally formed article can be conducted in the same manner as in the biodegradation of the sugar polymer before the thermal forming. Regarding this point, a description is given with reference to FIG. 1. (a) in FIG. 1 schematically illustrates the sugar polymer represented by the general formula (I). Reference numerals 1 and 2 indicate a sugar moiety (G) and an alkylene group moiety (R), respectively. Two degradation methods of the following degradation methods 1 and 2 may be used for the thermally formed article comprising the sugar polymer.

In the degradation method 1, the sugar polymer can be degraded into, for example, the sugar moiety 1 and another component moiety 2 as illustrated in (b) in FIG. 1 by subjecting it to an enzyme capable of breaking an ester linkage 3 between the sugar moiety (G) and the alkylene group moiety (R). More specifically, when an enzyme (for example, lipase or esterase) which catalyzes the hydrolysis of the ester linkage is caused to act on a sugar polymer having repeating units composed of cellobiose and sebacic acid, the ester linkages in the sugar polymer are hydrolyzed. As a result, cellobiose and sebacic acid are obtained as degradation products as illustrated in (b) in FIG. 1. These compounds are the same compounds as raw materials and can hence be repolymerized.

The degradation method 2 is applied to a system containing an oligosaccharide or polysaccharide. The sugar polymer can be degraded into, for example, the unit (double-headed glycolipids) having sugar at both terminals, and sugar as illustrated in (c) in FIG. 1 by subjecting it to an enzyme capable of hydrolyzing a glycoside linkage 4 between sugars in the sugar moiety 1. More specifically, when cellulose which catalyzes the hydrolysis of a β(1→4) linkage is caused to act on a sugar polymer comprising, for example, cellobiose having a β(1→4) linkage as an oligosaccharide and another component, the glycoside linkages in the sugar polymer are hydrolyzed. As a result, double-headed glycolipids and glucose are obtained as degradation products as illustrated in (c) in FIG. 1. In the sugar polymer illustrated in (a) in FIG. 1, oligosaccharide or polysaccharide moieties 1 and another moieties 2 are regularly arranged. Therefore, double-headed glycolipids and sugar, which have a comparatively even molecular weight, can be provided as degradation products.

Accordingly, when these degradation products are reused, there is no need of fractionating and purifying them, or simple purification compared with the conventional recycling process is satisfactry. Therefore, recycling cost of the degradation products can be reduced to a great extent.

The thermally formed articles according to the present invention exhibit excellent strength and are scarcely colored even by thermal forming. The thermally formed articles exhibit excellent biodegradability and recycling ability. The biodegradability and physical properties thereof can be easily controlled by adjusting the composition and molecular weight of the sugar polymer, the amount of additives used, etc.

(Mixing)

The sugar polymers according to the present invention may be mixed with other polymers so far as no detrimental influence is thereby imposed on the properties inherent in the sugar polymers.

The formed articles produced in accordance with the above-described process can be effectively used in any optional form such as a film, sheet or foamed body as packaging containers, disposable packaging containers (one-way containers), toys, furniture parts, building materials, and members, interior materials and housings of automobiles, household appliances and OA apparatus. Such formed articles have excellent biodegradability and recycling ability and hence scarcely exert an influence on the environment from the viewpoint of disposal and the like. Their applications are described more specifically. They can be used in application fields of such toner cartridges for electrophotographic image forming apparatus as illustrated in, for example, FIG. 7, recording mediums in the form of a film or sheet, etc. Such a recording medium can be obtained by forming the sugar polymer represented by the general formula (I) into powder or pellets and heating and forming such a formed product at, for example, about 100 to 180° C. by using an inflation method, T-die method, calendering method, casting method or the like, whereby a recording medium having excellent strength can be obtained in the form of a sheet or film.

When applied to the recording mediums, the sugar polymer desirably has a molecular weight of 10,000 to several millions, preferably 10,000 to several hundreds of thousands. Additives such as plasticizers and fillers may also be added so far as no detrimental influence is thereby imposed on the recycling ability of the sugar polymer.

No particular limitation is imposed on the thickness of the recording medium. However, it is preferably about 25 to 300 μm when the medium is used in general ink-jet printers.

(Opacification)

The recording medium is basically colorless and transparent and can be suitably used as a transparent recording medium for OHP. However, it may also be used as synthetic paper with the object of high-quality printing by opacifying it.

Methods of opacification include a method in which any publicly known white or color pigment is added to the sugar polymer. Alternatively, a method in which a white or color print is applied to the front or back surface of the recording medium, or a method in which a white or color film is laminated on the back surface of the recording medium is included.

Application of ink-receiving layer:

The recording medium can be used as a recording medium by itself. Namely, printing can be conducted on the surface of the recording medium by means of an ink-jet recording apparatus without separately providing any ink-receiving layer on the surface of the recording medium. However, an ink-receiving layer may be provided on the surface of the recording medium for achieving far excellent printing properties depending on the properties of inks used and the need. When the amount of a material used in the ink-receiving layer is controlled to about several percent based on the base material, no substantial problem arises from the viewpoint of recycling ability.

Any conventionally known material may be used as a material for forming the ink-receiving layer. Specific examples thereof include hydrophilic natural materials such as albumin, gelatin, casein, starch, cationic starch, gum arabic, agar and sodium alginate, and water-soluble or hydrophilic synthetic resins such as dextrin, viscose, methyl cellulose, ethyl cellulose, carboxymethyl cellulose, hydroxyethyl cellulose, cationically modified hydroxyethyl cellulose, polyvinyl alcohol, cationically modified polyvinyl alcohol, acetal-modified polyvinyl alcohol (polyvinyl acetal), polyethylene glycol, polypropylene glycol, polyacrylic acid, water-soluble alkyd resins, polyvinyl ether, polyvinyl pyrrolidone, quaternized polyvinyl pyrrolidone, polyamide, polyacrylamide, poly(N-vinyl-3-methyl-pyrrolidone), maleic acid copolymers, polyethylene-imine, polyethylene oxide, polyvinylimidazole, polyallylamine, polyallylamine hydrochloride, melamine resins, polyurethane and polyester. Two or more of these materials may be used in combination if desired.

In order to improve the physical properties of the recording medium, for example, resistance to beading, resistance to blocking, etc., various kinds of additives such as a dispersing agent, a lubricant, a pH adjuster, a fluorescent paint, a preservative and the like may be used within limits not deteriorating the performance of the recording medium according to the present invention.

A method for forming the ink-receiving layer on the surface of the recording medium comprises applying a coating formulation comprising such materials as described above to the surface of the recording medium by means of any conventionally known coating method, for example, a roll coating, rod bar coating, spray coating, air-knife coating or casting method. The thickness of the ink-receiving layer is preferably 1 to 50 $\mu$m, more preferably 2 to 30 $\mu$m.

Recycling Process:

The recording mediums recovered after use are subjected to a drinking treatment and then hydrolyzed in a basic aqueous solution or an aqueous solution of an enzyme to depolymerize the sugar polymer into a sugar compound and an organic acid or organic acid salt. Water is removed from the formed products, and the thus-obtained components can be reused in the synthesis of the polymer as they are, or after they are fractionated and purified if necessary, and reactive substitution is conducted if necessary.

The basic aqueous solution used in the hydrolysis is preferably a 0.01 to 1N aqueous solution of sodium hydroxide or potassium hydroxide. As to the enzyme, esterase or lipase for ester linkage, or peptidase or protease for peptide linkage (urethane linkage) is caused to act depending on the linkage to be hydrolyzed at optimum pH and temperature for the respective enzymolyses.

As described above, according to the present invention, there can be provided novel sugar polymers having excellent thermoplasticity, recycling ability and biodegradability. The sugar polymers can be formed into thermally formed articles making good use of the excellent thermoplasticity thereof, so that the provision of thermally formed particles having excellent recycling ability, biodegradability and mechanical properties becomes feasible.

The toner cartridges according to the present invention can be returned again to raw materials of plastics by a degradation treatment after disposal. When this degradation is conducted in a vessel, raw materials for degradable plastics can be recovered. When the degradation is conducted in soil on the other hand, the degradable plastic can be turned into a compost. The recycling ability of the sugar polymer making up the toner cartridge or recording medium can contribute to the problem of disposal and effective utilization of resources. There can also be provided recording mediums for ink-jet, which permit printing without separately providing any ink-receiving layer, for example, a transparent recording medium for OHP and synthetic paper.

The present invention will hereinafter be described specifically by the following examples. However, the present invention is not limited to these examples.

EXAMPLE 1

(Synthesis Example: Monosaccharide)

Glucose (50 g), dimethylformamide (200 ml) and pyridine (100 ml) were stirred at room temperature in a nitrogen atmosphere. A solution of adipoyl chloride (20 ml) diluted with dimethylformamide (100 ml) was added dropwise to this mixture, followed by stirring for 1 hour. After 1 hour, adipoyl chloride (20 ml) was added dropwise, and the resultant mixture was stirred for 1 hour. After 1 hour, dimethylformamide (200 ml) was added, and a solution of adipoyl chloride (20 ml) diluted with dimethylformamide (200 ml) was further added dropwise, followed by stirring for 1 hour. After the solvent was partially distilled off, the residue was poured into water to reprecipitate the reaction product. Precipitate thus formed was washed with ethanol to obtain colorless powder (Compound No. A-1).

The molecular weight of the polymer was determined under the following conditions by gel permeation chromatography (GPC).

Measuring apparatus: HLC 8020 manufactured by Tosoh Industries, Inc.

Column: Mixed-B (2 columns) manufactured by Polymer Laboratories Co.

Eluent: DMF, 50° C.

Standard: In terms of polysaccharide (product of Polymer Laboratories Co.).

The weight average molecular weight of the 5 resultant polymer was 940,000, and its degree of polymerization was estimated to be about 3200. A stretch peak of C=O at 1740 $cm^{-1}$ was observed by IR spectroscopic analysis. This result revealed that a sugar ester could be synthesized.

Sugar polymers (Compound Nos. A-2 to A-6) shown in Table 1 were synthesized in accordance with the above-described synthesis example.

TABLE 1

| Compound No. | G | R | n (degree of polymerization) |
|---|---|---|---|
| A-2 | Glucose | $C_8H_{16}$ | 3500 |
| A-3 | Glucose | $C_9H_{18}$ | 2500 |
| A-4 | Galactose | $C_6H_{12}$ | 800 |
| A-5 | Mannose | $C_4H_8$ | 2800 |
| A-6 | 2-Glucosamine | $C_8H_{16}$ | 4000 |

EXAMPLE 2

(Synthesis Example: Oligosaccharide)

Cellobiose (100 g) was added in N,N-dimethylformamide (DMF, 800 ml), and pyridine (400 ml) was added thereto. The mixture was heated to 70° C. in a nitrogen atmosphere. Sebacoyl chloride (85 ml) diluted with DMF (200 ml) was added dropwise to stir the resultant mixture for 3 hours. After completion of the reaction, the solvent was partially distilled off, and the residual reaction mixture was poured into water to conduct stirring. Precipitate thus formed was washed with methanol to obtain white powder (Compound No. B-1). The molecular weight of the polymer thus obtained was 900,000, and its degree of polymerization was estimated to be about 1800.

Figure 2:
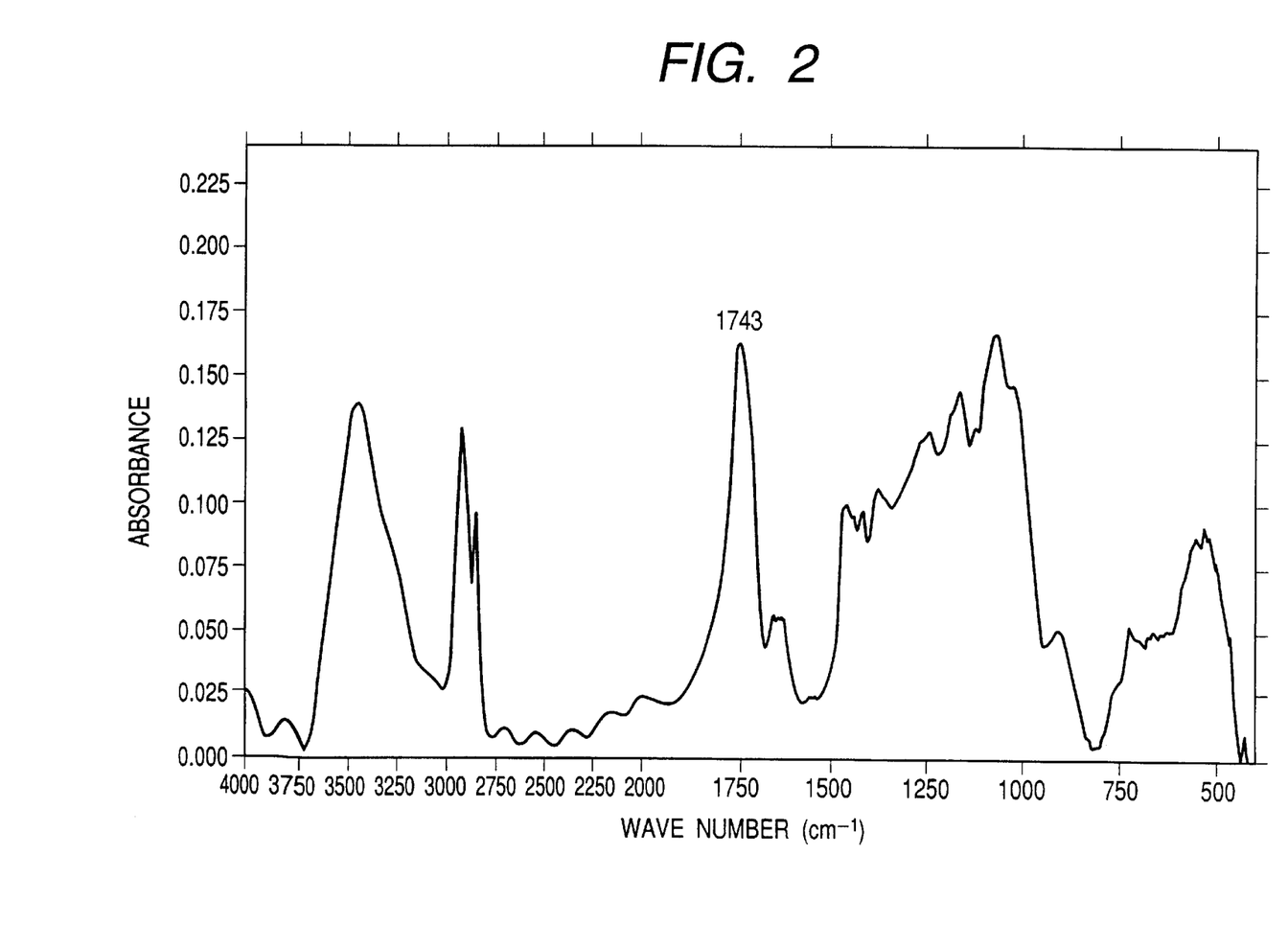
FIG. 2 diagrammatically illustrates an infrared spectrum of a sugar polymer (Compound No. B-1) according to the present invention.
Figure 3:
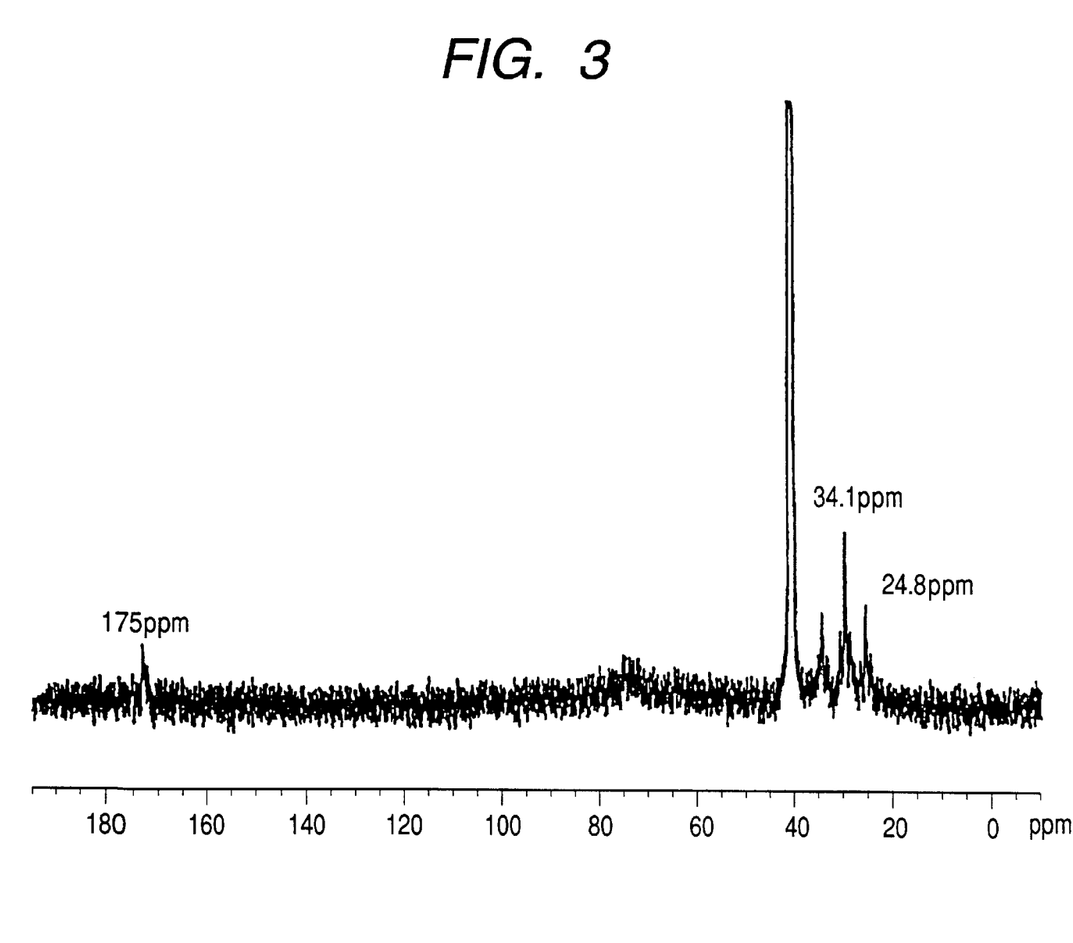
FIG. 3 diagrammatically illustrates a $^{13}$C-NMR data of the sugar polymer (Compound No. B-1) according to the present invention.

A stretch peak of C=O at 1743 $cm^{-1}$ as illustrated in FIG. 2, and a C=O group at 175 ppm and a methylene group of sebacic acid at 24.8 ppm and 34.1 ppm as illustrated in FIG.

3 were observed by IR spectroscopic analysis and 13C-NMR analysis, respectively. These results revealed that a sugar ester had been synthesized.

Figure 5:
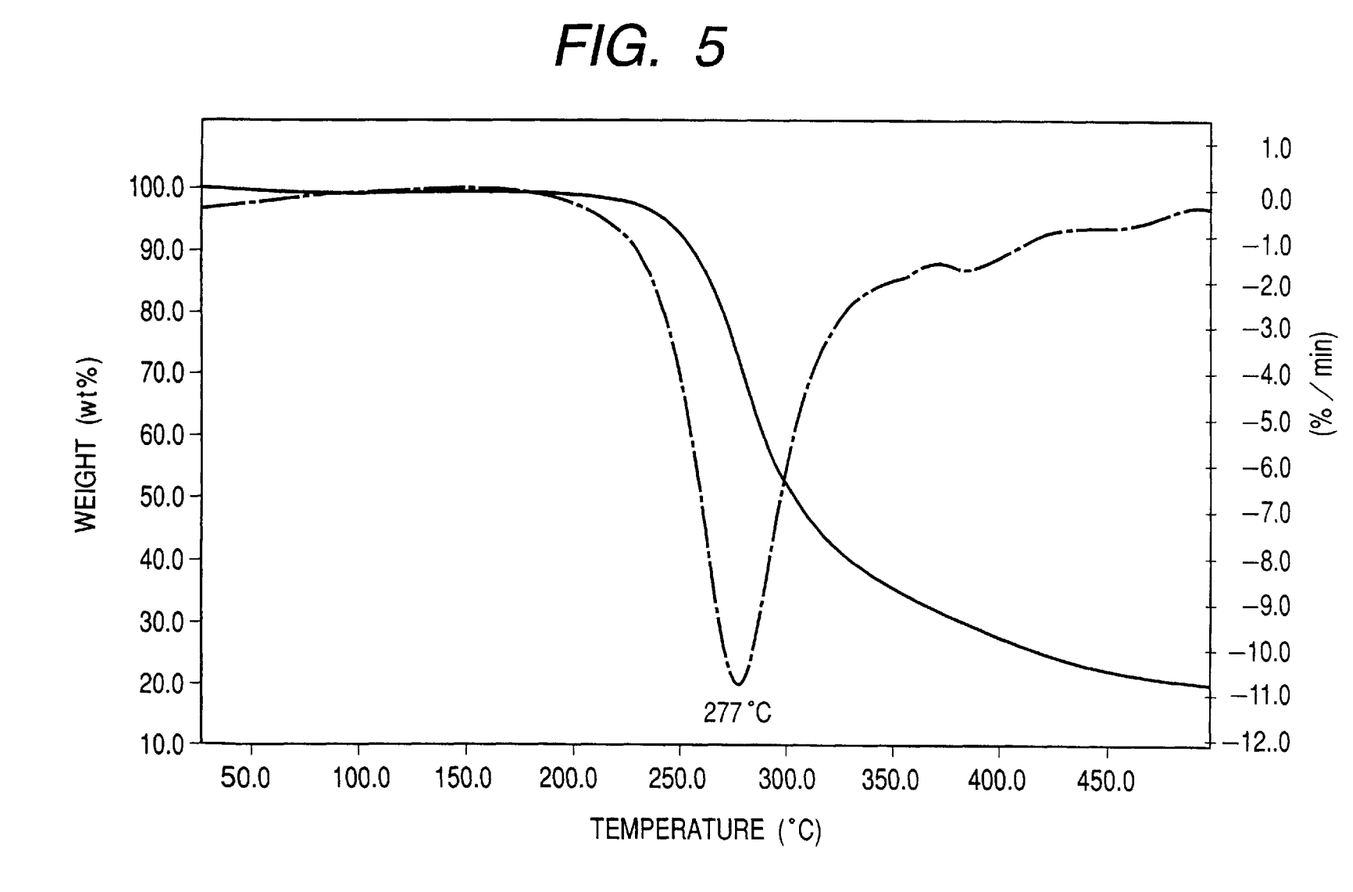
FIG. 5 diagrammatically illustrates a TG data of the sugar polymer (Compound No. B-1) according to the present invention.
Figure 6:
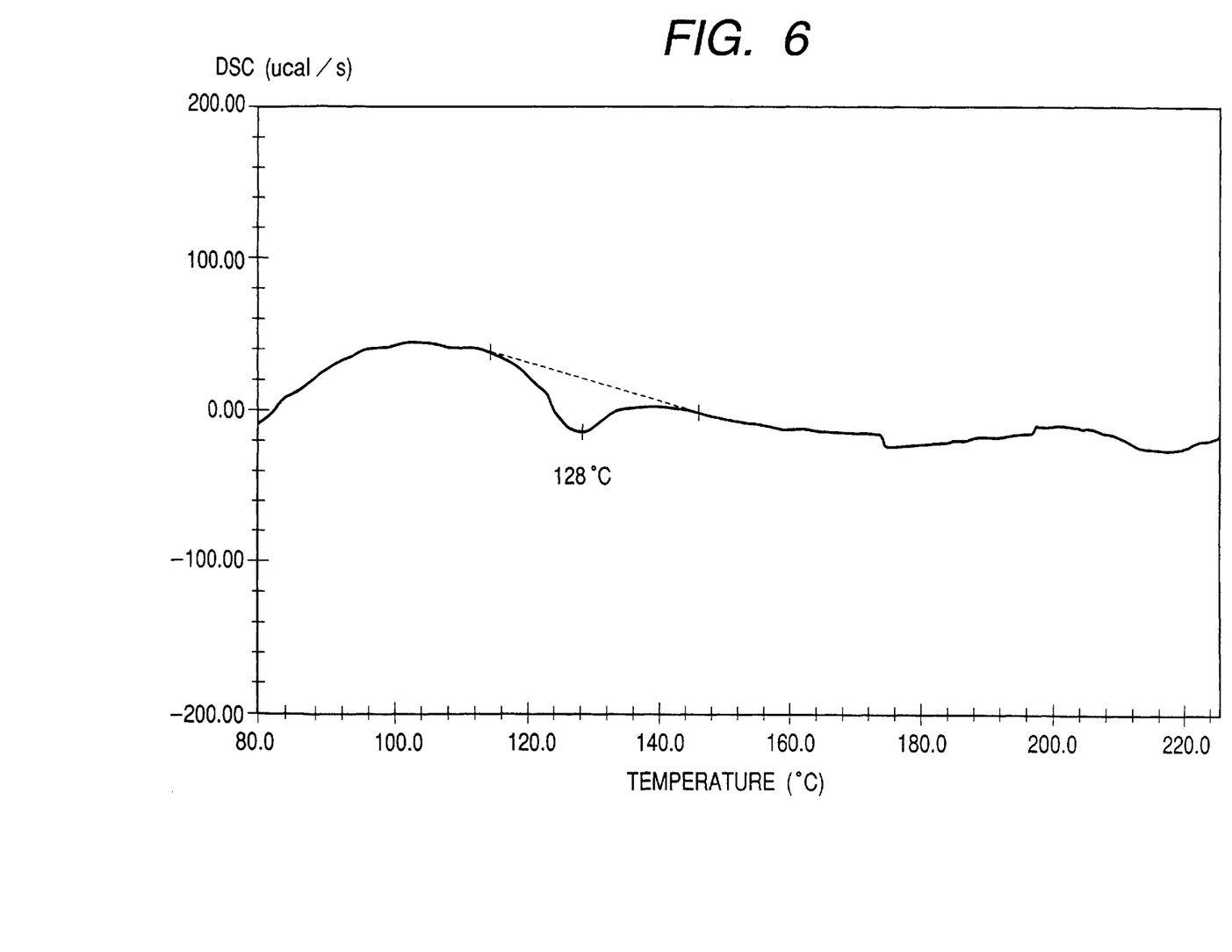
FIG. 6 diagrammatically illustrates a DSC data of the sugar polymer (Compound No. B-1) according to the present invention.

The TG data and DSC data of the sugar polymer (Compound No. B-1) are shown in FIG. 5 and FIG. 6, respectively.

Sugar polymers (Compound Nos. B-2 to B-19) shown in Table 2 were synthesized in accordance with the above-described synthesis example.

TABLE 2

| Compound No. | G | R | n (degree of polymerization) |
|---|---|---|---|
| B-2 | Cellobiose | $C_6H_{12}$ | 200 |
| B-3 | Cellobiose | $C_{10}H_{20}$ | 41 |
| B-4 | Maltose | $C_6H_{12}$ | 152 |
| B-5 | Chitotriose | $C_6H_{12}$ | 500 |
| B-6 | Chitobiose | $C_8H_{16}$ | 260 |
| B-7 | Lactose | $C_7H_{14}$ | 310 |
| B-8 | Cellotetraose | $C_9H_{18}$ | 180 |
| B-9 | Maltopentaose | $C_{12}H_{24}$ | 422 |
| B-10 | Chitohexaose | $C_{11}H_{22}$ | 40 |
| B-11 | Chitotriose | $C_{10}H_{20}$ | 350 |
| B-12 | Cellobiose | $C_9H_{18}$ | 80 |
| B-13 | Maltotriose | $C_7H_{14}$ | 116 |
| B-14 | Maltose | $C_{14}H_{28}$ | 800 |
| B-15 | Cellobiose | $C_7H_{14}$ | 900 |
| B-16 | Chitobiose | $C_{13}H_{26}$ | 760 |
| B-17 | Isomaltose | $C_6H_{12}$ | 500 |
| B-18 | Cellobiose | $C_7H_{14}$ | 1500 |
| B-19 | Maltose | $C_8H_{16}$ | 40 |

(Synthesis of Acetylated Product)

Powder (5 g) of Compound No. B-1 and anhydrous sodium acetate (1.3 g) were added to acetic anhydride (100 ml), and the mixture was stirred at 120° C. for 2 hours. The reaction mixture was poured into ice water (500 ml). The deposit was washed 3 times with water and dried to obtain pale brown powder (Compound No. B-1A). The acetylation of the original hydroxyl groups were confirmed by IR analysis. It was also confirmed by GPC analysis that the original molecular weight distribution scarcely varied. With respect to Compound No. B-19, an acetylated product (Compound No. B-19A) was obtained in a similar manner to the above.

EXAMPLE 3

(Synthesis Example: Polysaccharide)

Cellulose (5 g) was added in DMF (80 ml) and heated to 60° C. in a nitrogen atmosphere. Pyridine (1 ml) and azelaoyl chloride (2 ml) were added dropwise thereto, and the resultant mixture was stirred for 2 hours. After completion of the reaction, the reaction mixture was poured into ethanol (500 ml) to obtain precipitate. The precipitate was washed successively with ethanol and diethyl ether to obtain white powder (Compound No. C-1, 3 g).

The molecular weight of the polymer thus obtained was determined by GPC and was found to be 150,000.

Figure 4:
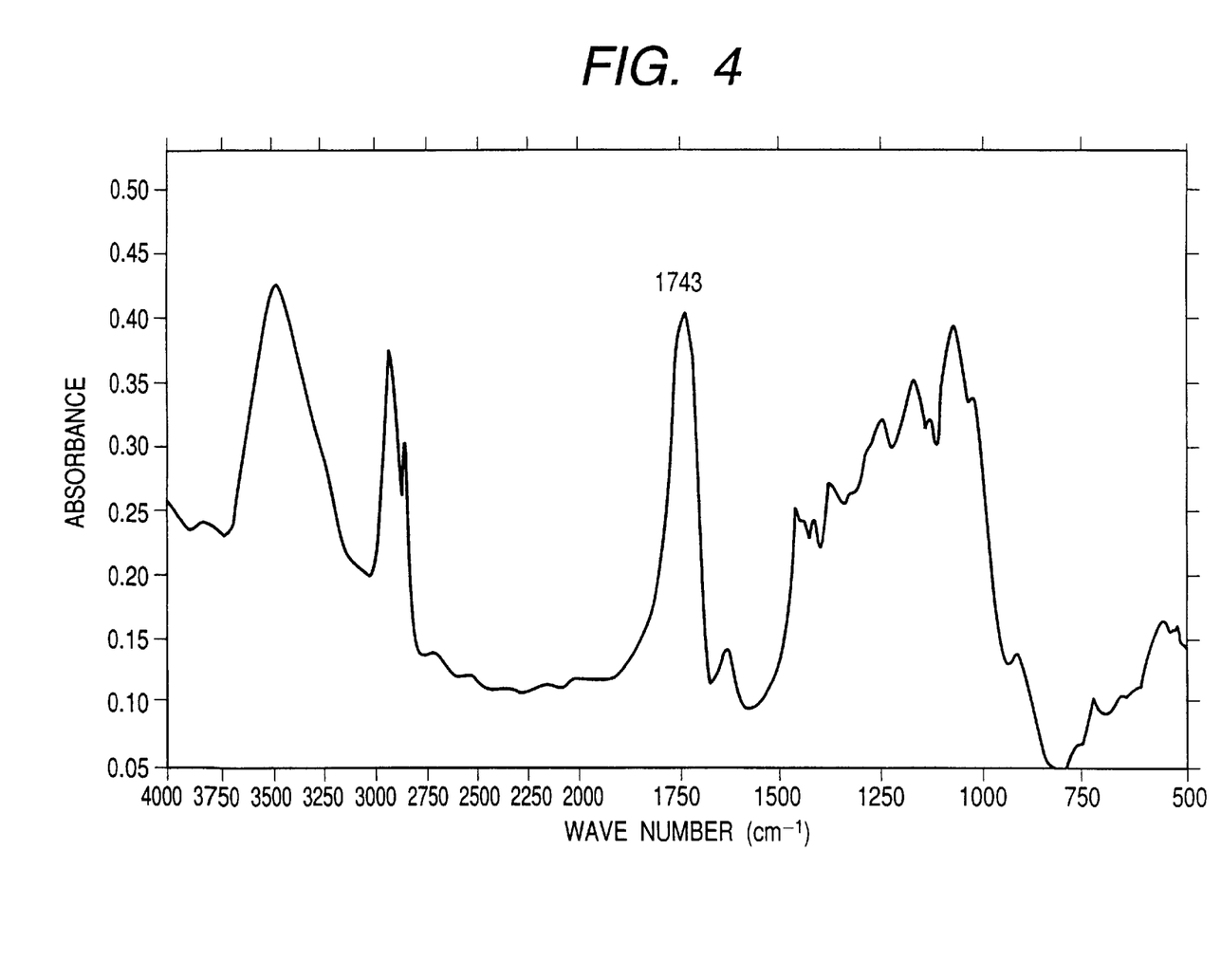
FIG. 4 diagrammatically illustrates an infrared spectrum of a sugar polymer (Compound No. C-1) according to the present invention.

A stretch peak of C=O as illustrated in FIG. 4 was observed by IR spectroscopic analysis. This result revealed that a sugar ester had been synthesized.

Sugar polymers (Compound Nos. C-2 to C-9) shown in Table 3 were synthesized in accordance with the above-described synthesis example.

TABLE 3

| Compound No. | G | R | n (degree of polymerization) |
|---|---|---|---|
| C-2 | Chitosan | $C_6H_{12}$ | 20 |
| C-3 | Starch (amylose) | $C_9H_{18}$ | 14 |
| C-4 | Acetyl cellulose | $C_8H_{16}$ | 30 |
| C-5 | Chitin | $C_{10}H_{20}$ | 11 |
| C-6 | Pullulan | $C_7H_{14}$ | 80 |
| C-7 | Amylose | $C_{13}H_{26}$ | 27 |
| C-8 | Cellulose | $C_8H_{16}$ | 40 |
| C-9 | Cellulose acetate butyrate | $C_{10}H_{20}$ | 120 |

EXAMPLES 4 to 8, and COMPARATIVE EXAMPLES 1 and 2

(Evaluation of Thermal Properties for Oligosaccharide System)

With respect to the compounds (Nos. A-1, B-1, B-18, B-14 and B-19) synthesized by the process described in EXAMPLE 1 or 2, the thermal properties (softening point and heat decomposition temperature) were determined.

The softening point was determined by means of a DSC (DSC Robo, trade name, manufactured by Perkin-Elmer Co.). The measurement was conducted from 40 to 500° C. with a heating rate of 10° C./min in a nitrogen atmosphere, and an endothermic peak appeared at a temperature lower than the heat decomposition temperature thereof was regarded as a softening point.

The decomposition point was determined by means of TG (thermobalance) (DSC7, trade name, manufactured by Perkin-Elmer Co.). The measurement was conducted from 30 to 500° C. with a heating rate of 10° C/min in a nitrogen atmosphere to find the heat decomposition temperature from a derivative curve.

As COMPARATIVE EXAMPLES 1 and 2, compounds were synthesized in a similar manner to EXAMPLE 2 except that sebacoyl chloride was changed to adipoyl chloride and terephthaloyl chloride, respectively. These compounds were named Compound Nos. R-1 and R-2, respectively. The thermal properties of the respective compounds are shown in Table 4.

TABLE 4

| Ex. No. | Compound No. | Softening point (° C.) | Heat decomposition temperature (° C.) |
|---|---|---|---|
| Ex. 4 | A-1 | 110 | 299 |
| Ex. 5 | B-1 | 127 | 277 |
| Ex. 6 | B-18 | 144 | 280 |
| Ex. 7 | B-14 | 159 | 274 |
| Ex. 8 | B-19 | 110 | 274 |
| Comp. Ex. 1 | R-1 | None | 320 |
| Comp. Ex. 2 | R-2 | None | 315 |

As shown in Table 4, Compound Nos. R-1 and R-2 are high in heat decomposition temperature and have excellent heat resistance, but are not softened at a temperature lower than the respective decomposition temperatures. Both Compound Nos. R-1 and R-2 were not softened, but browned (due to scorching) and decomposed when they were continuously heated.

Using a melting point measuring apparatus, Compounds Nos. B-1 and R-1 were separately held between cover glass sheets to visually observe the respective softening temperatures by pressing them with a metallic spatula. Compound No. B-1 was softened at a temperature around 140° C. However, Compound No. R-1 had no softening point even when it was heated to 320° C., and was gradually browned and decomposed.

From the results described above, it was found that the compounds according to the present invention are sugar polymers which are softened at a temperature lower than the decomposition point thereof by about 120 to 160° C. and have thermoplasticity. They were also found to be polymers having excellent processability for thermal forming, since their decomposition points and softening points are away from each other.

EXAMPLES 9 to 14 and COMPARATIVE EXAMPLE 3

(Production of Thermally Formed Article)

The compounds synthesized by the processes described in EXAMPLES 1 to 3 were thermally formed by means of a test hot press (Mini Test Press 10, trade name) manufactured by Toyo Seiki Seisaku-Sho, Ltd. The heating temperature and pressing conditions are shown collectively in Table 5. The compound used in COMPARATIVE EXAMPLE 1 was thermally formed in a similar manner to EXAMPLE 9 to produce a formed article as COMPARATIVE EXAMPLE 3.

TABLE 5

| Ex. No. | Compd. No. | Heating temp. (° C.) | Pressing conds. (kgf/cm$^2$) | Appearance of formed article |
|---|---|---|---|---|
| Ex. 9 | A-1 | 120 | 35 | Colorless and transparent |
| Ex. 10 | B-1 | 160 | 30 | Colorless and transparent |
| Ex. 11 | B-5 | 140 | 32 | Pale yellow and transparent |
| Ex. 12 | B-19 | 120 | 30 | Colorless and transparent |
| Ex. 13 | C-1 | 180 | 37 | Colorless and transparent |
| Ex. 14 | C-9 | 150 | 30 | Colorless and transparent |
| Comp. Ex. 3 | R-1 | 200–320 | 50 | Dark brown powder remained unformed |

As shown in Table 5, it was found that the sugar polymers according to the present invention can be formed at a temperature lower than 200° C. to provide transparent formed articles.

EXAMPLES 15 to 18

(Evaluation of Properties for Thermally Formed Article)

Strip-shape specimens were cut out of the formed articles produced in EXAMPLES 9, 10, 12 and 13 to determine their mechanical properties (tensile strength and elongation) by means of an autograph DSC-R-500 Model manufactured by Shimadzu Corporation. Furthermore, the same strip specimens were buried into an aged compost to evaluate them for biodegradability. After 6 months, the progress of biodegradation was observed to rank them as A where biodegradability was ack n owledged, or B where no biodegradability was acknowledged. The results are shown collectively in Table 6.

TABLE 6

| Ex. No. | Compd. No. | Tensile strength (kgf/cm$^2$) | Elongation (%) | Flexural strength (kgf/mm$^2$) | Biodegradability |
|---|---|---|---|---|---|
| Ex. 15 | A-1 | 220 | 1.4 | 2.2 | A |
| Ex. 16 | B-1 | 200 | 1.2 | 3.0 | A |
| Ex. 17 | B-19 | 75 | 8.0 | 2.5 | A |
| Ex. 18 | C-1 | 180 | 2.8 | 5.2 | A |

As shown in Table 6, it was clarified that the thermally formed articles according to the present invention a re biodegradable formed articles having mechanical tensile properties sufficiently falling within a serviceable range.

EXAMPLE 19

(Evaluation 1 of Recycling Ability for Thermally Formed Article)

A thermally formed article (using Compound No. B-2) produced in a similar manner to EXAMPLE 10 was finely ground by a grinder. The powder (1 g) obtained by this grinding and an esterase enzyme (product of Boehringer Mannheim Co.) were added in a buffer solution of pH 7.5 and stirred at 45° C. After a week, a supernatant liquid of the reaction mixture was analyzed by means of a high-performance liquid chromatograph (HPLC) (LC-8020, trade name, manufactured by Tosoh Corp.; column: SH1011, trade name, manufacture by Showa Denko K.K.; eluent: water). As a result, peaks corresponding to low-molecular weight sugar and an organic acid were newly observed. The intensity of these peaks gradually increased while the time went on. The corresponding eluates to peaks were fractionally taken out to determine their spectra. As a result, the sugar and organic acid were identified as an oligosaccharide and a fatty acid. The fatty acid was further identified as suberic acid by NMR.

These sugar and fatty acid could also be fractionally taken out by extracting the reaction mixture with water for the sugar and with diethyl ether for the fatty acid. Suberoyl chloride was newly added to the sugar thus taken out to react them in a similar manner to the synthesis example in Example 2, whereby the sugar could be repolymerized. Therefore, the sugar turned out to be able to recycle.

EXAMPLE 20

(Evaluation 2 of Recycling Ability for Thermally Formed Article)

A thermally formed article (using Compound No. B-7) produced in a similar manner to EXAMPLE 10 was finely ground by a grinder. The powder (1 g) obtained by this grinding and a lactase enzyme (product of Sigma Chemical Co., 2 mg) were reacted in a buffer solution (3 ml) of pH 4.4 at 25° C. As a result, a low-molecular weight product was gradually obtained.

After 10 days, the compound obtained by the degradation was subjected to GPC analysis. As a result, the compound was found to have a weight average molecular weight of about 6,000. Azelaic acid (1 g) was added to this degradation product, and the mixture was heated at 200° C. for 20 minutes to conduct repolymerization by melt polymerization. The resultant polymer was purified by washing with ethanol and ether. The molecular weight thereof was determined by GPC, so that the product was identified as a repolymerized resin composition having a molecular weight of 50,000.

EXAMPLE 21

(Production of Toner Supply Container)

Powder of Compound No. B-1 synthesized in EXAMPLE 2 was compression molded under the same conditions as in

Figure 7:
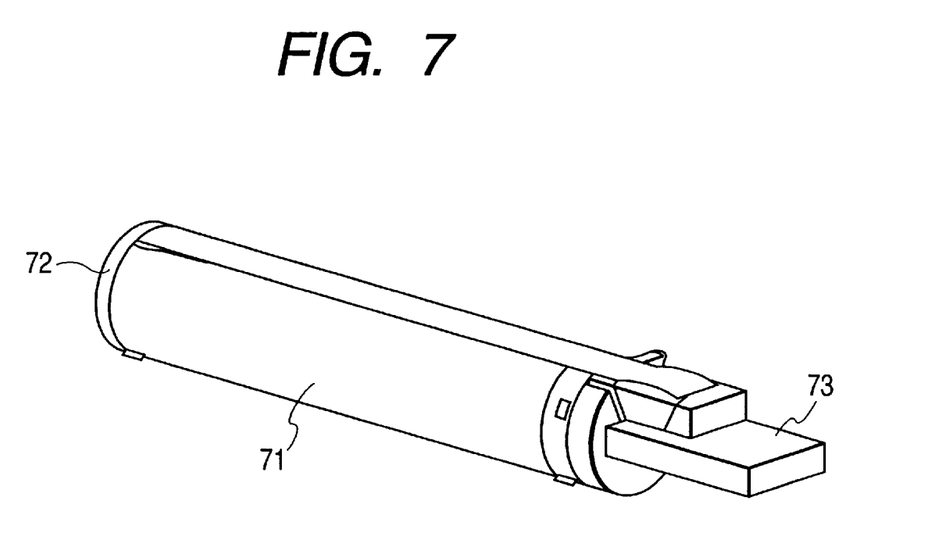
FIG. 7 is a schematic perspective view of a toner cartridge.

EXAMPLE 10 to process it into a toner supply container illustrated in FIG. 7, which is a component of a toner cartridge for copying machine. FIG. 7 is a schematic perspective view of the toner supply container according to this example, which is a part making up the so-called stationary type (built-in type) toner cartridge that is installed in a copying machine to gradually supply a development mechanism with a toner until the toner is consumed. In FIG. 7, reference numeral 71 indicates the toner supply container formed of the biodegradable polymer according to this example. Reference numeral 72 designates a flange fitted at an end of the toner supply container 71, and 73 a gripping part which serves as a grip when the toner cartridge is installed in and removed from the copying machine.

EXAMPLE 22

(Evaluation of Toner Supply Container as to Recycling Ability)

The toner supply container produced in EXAMPLE 21 was recovered and pelletized by a grinder. The pellets were subjected to enzymolysis. The degradation was conducted by adding the pellets in a buffer solution (pH: 8, solution temperature: 40° C.) containing an enzyme (esterase). It could be identified that an oligosaccharide and sebacic acid, which are raw materials of a degradable plastic, and an ester compound having a cellobiose residue at terminals thereof were present in the solution. The identification of the degradation products was conducted by NMR and IR analyses for the degradation products fractionally taken out by GPC. These degradation products were able to be repolymerized into a sugar polymer again in a similar manner to EXAMPLE 19.

EXAMPLE 23

(Evaluation of Biodegradability for Toner Supply Container)

The toner supply container produced in EXAMPLE 21 was left to stand for 6 months in soil to observe that it was degraded and partially lost.

EXAMPLE 24

(Synthesis of Polymer)

Cellobiose (50 parts) was suspended in dimethylformamide (400 parts), and pyridine (200 parts) was added to the suspension. The resultant mixture was heated to 80° C. in a nitrogen atmosphere. Sebacoyl chloride (40 parts) diluted with dimethylformamide (200 parts) was added thereto, and the resultant mixture was stirred for 2 hours. After the solvent was partially distilled off, the residual reaction mixture was poured into water to conduct stirring. Precipitate thus formed was washed with methanol. The average molecular weight of the polymer thus obtained was about 200,000.

EXAMPLES 25 to 29

(Synthesis of Polymer)

Polymers were synthesized from the following respective raw materials (shown in Table 7) in a similar manner to EXAMPLE 24. However, in only the case of EXAMPLE 25, after the reaction was conducted for 2 hours, methanol (100 parts) was added to conduct lux for additional 2 hours.

TABLE 7

| Ex. | Sugar compound | Organic acid (derivative) | Molecular weight |
|---|---|---|---|
| 25 | Cellobiose | Suberoyl chloride | 100,000 |
| 26 | Maltose | sebacoyl chloride | 200,000 |
| 27 | Chitobiose | Azelaoyl chloride | 250,000 |

TABLE 7-continued

| Ex. | Sugar compound | Organic acid (derivative) | Molecular weight |
|---|---|---|---|
| 28 | Cellulose (molecular weight: 12,000) | Sebacoyl chloride | 50,000 |
| 29 | Chitosan (molecular weight: 20,000) | Sebacoyl chloride | 80,000 |

EXAMPLES 30 to 35

(Production of Transparent Recording Medium)

Each of powders of the polymers synthesized in EXAMPLES 24 to 29 was extruded through a T-die, and the extrudate was successively biaxially oriented into a film having a thickness of 110 pm, thereby obtaining a recording medium. In the formation of the film, the sugar polymer was heated to about 150 to 180° C. The recording mediums thus obtained were all transparent and had their corresponding average transmittances in a visible region (400 to 800 nm) as shown in Table 8.

TABLE 8

| Ex. | Polymer | Corr. Ex. of polymer synthesis | Average transmittance (%) | Haze (%) |
|---|---|---|---|---|
| 30 | Cellobiose = sebacic acid | 24 | 92 | 1.2 |
| 31 | Cellobiose = suberic acid | 25 | 95 | 1.0 |
| 32 | Maltose = sebacic acid | 26 | 96 | 1.1 |
| 33 | Chitobiose = azelaic acid | 27 | 92 | 1.1 |
| 34 | Cellulose = sebacic acid | 28 | 90 | 2.3 |
| 35 | Chitosan = sebacic acid | 29 | 88 | 1.8 |

EXAMPLE 36

(Production of Opaque Recording Medium)

Titanium oxide (R-580, trade name, product of Ishihara Sangyo Co, Ltd., 10 % by weight) was mixed with the powder of the polymer synthesized in EXAMPLE 24 to produce a filmy recording medium having a thickness of 120 pm in a similar manner to the above. The recording medium thus obtained was white and opaque and had a gloss.

EXAMPLES 37 to 43

(Printing Examples)

Arrays of arbitrary characters and solid prints of cyan, yellow and magenta colors were printed on the recording mediums produced in EXAMPLES 30 to 36 using an ink-jet printer (BJC-600J, trade name, manufactured by Canon Inc.). For the sake of comparison, the same printing was conducted on a commercially available OHP film for color ink-jet printing (CF-102, trade name, product of Canon Inc.).

In OHP films for PPC having no water-based ink- receiving layer, and the like, there generally seems such disadvantages that ink droplets come near to the center of the printed area, and inks run out. However, the recording mediums according to the present invention all permitted clear printing. Even with respect to the drying rate and color development of inks, they were substantially equivalent to the OHP film for color ink-jet printing.

EXAMPLE 44

(Recording Medium Having Ink-receiving Layer)

A coating formulation having the following composition was applied as an ink-receiving layer to the film at 110 μm thick formed in EXAMPLE 30 (Cellobiose=sebacic acid system) by a bar coater so as to obtain a thickness of 5 μm. The film was dried at 80° C. It was confirmed that the recording medium thus obtained permits printing by the method described above.

Composition of Coating Formulation:

Polyvinyl pyrrolidone (PVP K-90, 1% by weight trade name, product of GAF)

Cationically modified polyvinyl 9% by weight alcohol (PVA-CM-318, trade name, product of Kuraray Co., Ltd.)

Water 90% by weight.

EXAMPLES 45 to 50
(Recovery of Raw Material)

The filmy recording mediums produced in EXAMPLES 30 to 35 were ground, and each (10 g) of the ground products was added into a 0.1N aqueous solution (500 ml) of sodium hydroxide, followed by stirring at 70° C. for 10 hours. It was identified by gel filtration chromatography that the molecular weight was reduced near to the value of each sugar polymer as a raw material. If insoluble matter was present in the solution, it was separated by filtration. The residual aqueous solution was then adjusted to pH 5 with 0.1N hydrochloric acid. Insoluble matter produced was separated by filtration, and the remaining aqueous solution passed through an ion-exchange resin (Amberlite IR-120B, trade name, product of Japan Organo Co., Ltd.) and then dried to solid at 35° C. and 20 mmHg. By IR absorption spectra, the respective fractions were identified as shown in Table 9. In each case, the recovery rate was at least 90%.

TABLE 9

| Ex. | Corr. Ex. of polymer synthesis | Water-insoluble matter (at alkali) | Water-insoluble matter (at pH 5) | Water-soluble matter |
|---|---|---|---|---|
| 45 | 24 | None | Sebacic acid | Cellobiose |
| 46 | 25 | None | suberic acid | Cellobiose |
| 47 | 26 | None | Sebacic acid | Maltose |
| 48 | 27 | None | Azelaic acid | Chitobiose |
| 49 | 28 | Cellulose | Sebacic acid | None |
| 50 | 29 | Chitosan | Sebacic acid | None |

EXAMPLE 51
(Recovery of Raw Material by Enzyme)

The filmy recording mediums produced in EXAMPLES 30 to 33 were ground, and each (10 g) of the ground products and lipase powder (Lipase Amano PF, trade name, product of Amano Pharmaceutical Co., Ltd.; 40 g) were added into a buffer solution (0.1 mol/l potassium dihydrogenphosphate/ sodium hydroxide; 500 ml) of pH 7.0, and the mixture was stirred at 45° C. for 2 days. It was identified by gel filtration chromatography that a component having a molecular weight equal to that of each sugar polymer as a raw material increased. Solids containing the enzyme powder were separated by filtration, and the residual aqueous solution was then adjusted to pH 5 with 0.1N hydrochloric acid. Insoluble matter produced was then separated by filtration, and the remaining aqueous solution passed through an ion-exchange resin (Amberlite IR-120B, trade name, product of Japan Organo Co., Ltd.) and then dried to solid at 35° C. and 20 mmHg. By IR absorption spectra, the insoluble matter (at pH 5) and soluble matter were identified as its corresponding fatty acid and sugar compound, respectively. In each case, the recovery rate was 50 to 70%.

What is claimed is:

1. A thermally formed article comprising a thermoplastic sugar polymer represented by the general formula wherein G is a residue of a monosaccharide, oligosaccaharide or polysaccharide, R is a linear or branched alkylene group having at least 4 carbon atoms when G is the residue of the monosaccharide, or a linear or branched alkylene group having at least 6 carbon atoms when G is the residue of the oligosaccharide or polysaccharide, and n is an integer of 1 to 5,000.

2. The thermally formed article according to claim 1, wherein R is a linear or branched alkylene group having 6 to 14 carbon atoms.

3. The thermally formed article according to claim 1, wherein the thermally formed article has flexural strength of 1.0 to 6.0 kg /mm$^2$ and tensile strength of 20 to 700 kg/cm$^2$.

4. The thermally formed article according to claim 1, wherein the sugar residue forms an ester linkage when it is a residue of a sugar containing only hydroxyl groups, or an amide linkage and/or an ester linkage when it is a residue of a sugar containing amino groups.

5. The thermally formed article according to claim 1, wherein the sugar residue is a residue of a monosaccharide, oligosaccharide or polysaccharide containing only a pyranose ring.

6. The thermally formed article according to claim 1 or 5, wherein the monosaccharide is at least one of glucose, mannose, galactose and glucosamine.

7. The thermally formed article according to claim 1 or 5, wherein the oligosaccharide is at least one of maltose, cellobiose, lactose, isomaltose, chitobiose, nigerose, trehalose, melibiose, cellotriose, chitotriose, maltotriose, cellotetraose, chitotetraose, maltotetraose, cellopentaose, maltopentaose, chitopentaose, cellohexaose, maltohexaose and chitohexaose.

8. The thermally formed article according to claim 1 or 5, wherein the polysaccharide is at least one of cellulose, starch, glycogen, galactan, mannan, chitin, chitosan and pullulan.

9. The thermally formed article according to claim 1 or 2, wherein the number of carbon atoms in R is 6 to 10.

10. A process for producing a thermally formed article, comprising the step of heating a thermoplastic sugar polymer represented by the following general formula to a temperature not lower than the softening point thereof, but lower than the heat decomposition temperature thereof to form it, wherein G is a residue of a monosaccharide, oligosaccharide or polysaccharide, R is a linear or branched alkylene group having at least 4 carbon atoms when G is the residue of the monosaccharide, or a linear or branched alkylene group having at least 6 carbon atoms when G is the residue of the oligosaccharide or polysaccharide, and n is an integer of 1 to 5,000.

11. A toner cartridge comprising the thermally formed article according to claim 1.

12. A recording medium comprising the thermally formed article according to claim 1.

* * * * *